United States Patent
Thomson et al.

(10) Patent No.: US 9,990,394 B2
(45) Date of Patent: Jun. 5, 2018

(54) VISUAL SEARCH AND RECOMMENDATION USER INTERFACE AND APPARATUS

(75) Inventors: Clayton Alexander Thomson, Thousand Oaks, CA (US); Samir Ahmed, Culver City, CA (US); Basil Badawiyeh, Santa Clarita, CA (US); Kenneth Alan Rudman, South Pasadena, CA (US); Jason Martell, Los Angeles, CA (US); Roger Yeh, San Marino, CA (US); Vasil Nadzakov, Beverly Hills, CA (US); Daniel Joseph Hill, Los Angeles, CA (US); Ryan Cameron Coulter, Portland, OR (US); Greg Alan Martin, Portland, OR (US); Rodrigo Thomaz Moyses, Portland, OR (US); Isaac Anthony Marchionna, Portland, OR (US); Francois Xavier-Alexandre Montay, New York, NY (US); Laura ODonnell-Dunn, Hermosa Beach, CA (US)

(73) Assignee: Thomson Licensing (FR)

( * ) Notice: Subject to any disclaimer, the term of this patent is extended or adjusted under 35 U.S.C. 154(b) by 824 days.

(21) Appl. No.: 14/119,822

(22) PCT Filed: May 25, 2012

(86) PCT No.: PCT/US2012/039549
§ 371 (c)(1),
(2), (4) Date: Apr. 30, 2014

(87) PCT Pub. No.: WO2012/162597
PCT Pub. Date: Nov. 29, 2012

(65) Prior Publication Data
US 2016/0188658 A1 Jun. 30, 2016

Related U.S. Application Data

(60) Provisional application No. 61/500,802, filed on Jun. 24, 2011, provisional application No. 61/490,576, filed on May 26, 2011.

(51) Int. Cl.
*G06F 17/30* (2006.01)
*G06Q 30/02* (2012.01)
(Continued)

(52) U.S. Cl.
CPC ........ *G06F 17/30392* (2013.01); *G06F 3/017* (2013.01); *G06F 3/0482* (2013.01);
(Continued)

(58) Field of Classification Search
CPC .......... G06F 17/30058; G06F 17/3084; G06F 3/017; G06F 3/0482; G06F 3/04842;
(Continued)

(56) References Cited

U.S. PATENT DOCUMENTS

| 5,982,369 A | * 11/1999 | Sciammarella ... G06F 17/30696 345/440 |
| 6,006,225 A | 12/1999 | Bowman et al. |

(Continued)

FOREIGN PATENT DOCUMENTS

JP 2007226536 9/2007

OTHER PUBLICATIONS

International Search Report for PCT/US12/39549 dated Aug. 23, 2012. (3 pages).

*Primary Examiner* — Debbie Le
(74) *Attorney, Agent, or Firm* — Jack Schwartz & Associates, PLLC

(57) ABSTRACT

The present disclosure is directed towards conducting a search for content and results using a user interface. A number of graphical objects (715) and filters are displayed where a search query is generated in response to a user gesture (730) that selects a graphical object and filter. The filters shown can change depending on various factors that impact what filters are selected from a group of filters (720).

19 Claims, 6 Drawing Sheets

(51) Int. Cl.
*G06F 3/0488* (2013.01)
*H04L 12/28* (2006.01)
*G06F 3/01* (2006.01)
*G06F 3/0482* (2013.01)
*G06F 3/0484* (2013.01)

(52) U.S. Cl.
CPC ...... *G06F 3/04842* (2013.01); *G06F 3/04883* (2013.01); *G06F 17/30058* (2013.01); *G06F 17/3084* (2013.01); *G06F 17/30554* (2013.01); *G06Q 30/02* (2013.01); *H04L 12/2812* (2013.01); *H04L 12/2814* (2013.01)

(58) Field of Classification Search
CPC ......... G06F 17/30392; G06F 17/30554; H04L 12/2812; H04L 12/2814
USPC ............................. 707/722, E17.082, E17.03
See application file for complete search history.

(56) References Cited

U.S. PATENT DOCUMENTS

| | | | | |
|---|---|---|---|---|
| 8,233,999 | B2 * | 7/2012 | Herberger | G06F 17/30772 700/94 |
| 8,364,698 | B2 * | 1/2013 | Delgo | G06F 17/3079 707/769 |
| 8,555,182 | B2 * | 10/2013 | Dietz | G06F 17/30864 707/705 |
| 9,292,602 | B2 * | 3/2016 | Morris | G06Q 50/00 |
| 2001/0054054 | A1 | 12/2001 | Olson | |
| 2002/0169759 | A1 | 11/2002 | Kraft et al. | |
| 2007/0157129 | A1 * | 7/2007 | Facemire | G06F 17/30554 |
| 2007/0260582 | A1 | 11/2007 | Liang et al. | |
| 2008/0208819 | A1 | 8/2008 | Wang et al. | |
| 2008/0249984 | A1 * | 10/2008 | Coimbatore | G06F 17/30864 |
| 2009/0024940 | A1 | 1/2009 | Zeringue et al. | |
| 2009/0070321 | A1 * | 3/2009 | Apartsin | G06F 17/30967 |
| 2010/0070483 | A1 * | 3/2010 | Delgo | G11B 27/034 707/706 |
| 2010/0070523 | A1 * | 3/2010 | Delgo | G06F 17/3079 707/769 |
| 2010/0070529 | A1 | 3/2010 | Gokturk et al. | |
| 2010/0106732 | A1 * | 4/2010 | Atallah | G06F 17/30997 707/749 |
| 2010/0196864 | A1 * | 8/2010 | Lee | G09B 23/283 434/264 |
| 2011/0055753 | A1 | 3/2011 | Horodezky et al. | |
| 2011/0196864 | A1 * | 8/2011 | Mason | G06F 3/0416 707/728 |
| 2012/0197857 | A1 | 8/2012 | Huang et al. | |
| 2014/0344241 | A1 * | 11/2014 | Hong | G06F 17/30014 707/709 |
| 2015/0134688 | A1 * | 5/2015 | Jing | G06F 17/30277 707/766 |
| 2016/0162552 | A1 * | 6/2016 | Morris | G06Q 50/00 707/722 |

* cited by examiner

VISUAL SEARCH AND RECOMMENDATION USER INTERFACE AND APPARATUS

This application claims the benefit, under 35 U.S.C. § 365 of international Application PCT/US2012/039549, filed May 25, 2012, which was published in accordance with PCT Article 21(2) on Nov. 29, 2012 in English and which claims the benefit of U.S. provisional application No. 61/500,802, filed Jun. 24, 2011, and U.S. provisional application No. 61/490,576, filed May 26, 2011.

FIELD OF THE INVENTION

The present disclosure generally relates to digital content systems and methods for searching through a large amount of media content in a graphical way, and more particularly, to a system, method and a graphical user interface for selecting a particular piece of content or content grouping from a large number of possibilities.

BACKGROUND OF THE INVENTION

Home entertainment systems, including television and media centers, are converging with the Internet and providing access to a large number of available sources of content, such as video, movies, TV programs, music, etc. This expansion in the number of available sources necessitates a new strategy for navigating a media interface associated with such systems and making content selections.

The large number of possible content sources creates an interface challenge that has not yet been successfully solved in the field of home media entertainment. This challenge involves successfully presenting users with a large number of elements (programs, sources, etc.) without the need to tediously navigate through multiple display pages or hierarchies of content.

Further, most existing search paradigms make an assumption that the user knows what they are looking for when they start, whereas often, a mechanism to allow a process of discovery and cross linkage is more desirable or appropriate.

The information bottleneck in conventional media guide interfaces is largely the result of the limits to user awareness. If users cannot see all of the possible choices at one time, or are forced to spend inordinate amounts of time and effort in order to gain awareness of the same, then it is likely that opportunities will be missed. In addition, the notion of a workable, largely graphical search paradigm remains elusive.

SUMMARY OF THE INVENTION

A method and an apparatus are presented a visual search user interface is used for searching for related content. Search results are displayed in the form of graphical objects that comport to different search corresponding to images content (e.g., people, poster art, and the like). A search query is generated by using the metadata associated with a selected graphical object and filter in response to a user gesture. The filters that are available change depending on various factors. The results of the search query can be the further display of more graphical objects and filters.

DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DESCRIPTION OF THE PREFERRED EMBODIMENTS

Figure 1:
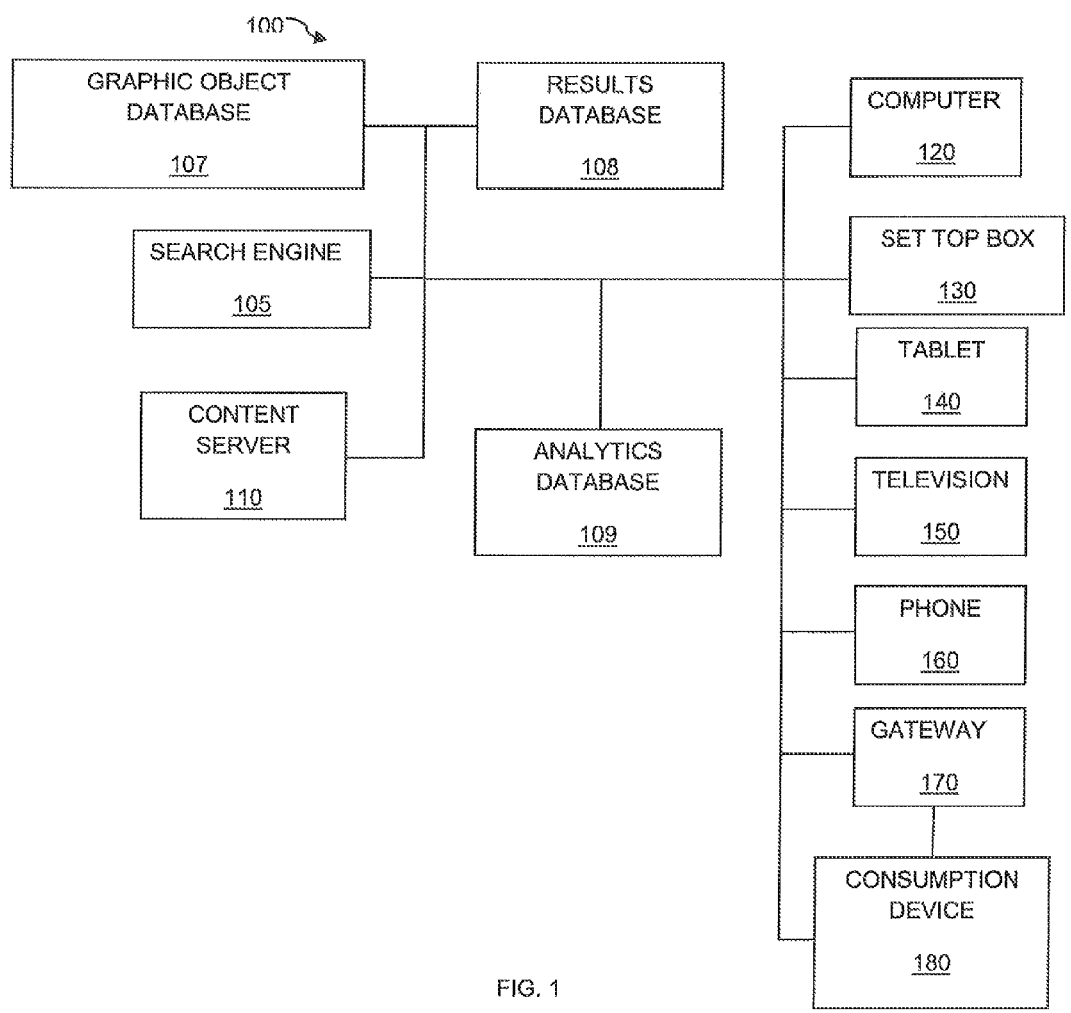
FIG. 1 is a block diagram of an exemplary system for a graphical search engine in accordance with an embodiment of the present disclosure.

FIG. 1 presents an exemplary embodiment of a system 100 in accordance with the present disclosure. Specifically, system 100 can be used for implementing a graphical search engine which is used for finding content for an operation such as purchase, recording, playback, and the like. Search engine 105 is implementable as a search engine for which a user can make textual queries whereby such a query is searched against the results in a results database 108. Search engine 105 can be used to make graphical search queries in accordance with the present disclosure where a search query used as the basis metadata that is associated with a graphical object, as explained below.

That is, a graphical object represents a picture such as a thumbnail, .jpg, .png, .gif, icon, or other graphic that represents a particular person, thing, content, and the like. Some examples of graphical objects include a picture of a person such as a director or actor, poster art of a television show or movie, an object such as a jacket or chair, and the like. Each of these graphical objects can have metadata associated with them in accordance with an exemplary embodiment shown in TABLE 1 below. The activation of a graphical object in accordance with gestures, such as a click, drag, and the like can activate the transmission of content associated with the graphical object from content server 110 to a user device or be used in a search operation using search engine 105.

TABLE 1

| FILE NAME | CLASS | DESCRIPTION | METADATA |
| --- | --- | --- | --- |
| GEORGECLOONEY.JPG | ACTOR | GEORGE CLOONEY | /NAME - GEORGE CLOONEY; /BIRTHPLACE - LEXINGTON KENTUCKY; |

TABLE 1-continued

| FILE NAME | CLASS | DESCRIPTION | METADATA |
|---|---|---|---|
| | | | /MOVIEROLE - THREE KINGS - ARCHIE GATES; /MOVIEROLE - BATMAN&ROBIN - BRUCE WAYNE; |
| BATMANROBIN.PNG | MOVIE | BATMAN&ROBIN | /MACTOR - GEORGE CLOONEY - BRUCE WAYNE; /MACTOR - ALICIA SILVERSTONE - BARBARA WILSON; /MACTOR - ARNOLD SCHWARTZENEGGER - VICTOR FRIES; |
| ER.PNG | TELEVISION | ER | /TACTOR - GEORGE CLOONEY - DOUG ROSS; /TACTOR - NOAH WYLE - JOHN CARTER; |
| BATARANG.PNG | MOVIEOBJECT | BATARANG | /MOBJECT - BATARANG - BATMAN&ROBIN |

Several exemplary metadata fields are shown in TABLE 1 which can be used to describe exemplary graphical objects. For example, the metadata field FILE NAME is used for identifying the file name of a graphical file which can be a mix of alphanumeric characters, a picture which is identified by a uniform resource identifier (URI), and the like. CLASS represents a metadata field that is used to associate with a graphical object with being related to a movie using the field MOVIE, actor for an ACTOR, an object from a movie being MOVIEOBJECT, and the like.

The metadata field DESCRIPTION describes the specific attribute of a graphic object which typically contains the name of the graphical object. For example, for the graphical object GEORGECLOONEY.JPG, the NAME of the graphical object is the actor GEORGE CLOONEY. Other examples are possible in accordance with the disclosed embodiments.

TABLE 2

| | Description of field. |
|---|---|
| The field METADATA describes specific attributes of a graphical object where each CLASS can have different METADATA fields used. For example, for the metadata CLASS ACTOR, the metadata fields that can be used include/NAME which the name of an actor, /BIRTHPLACE which is the birthplace of an actor, /MOVIEROLE which identifies both the movie and the role an actor played in a movie and the like. The CLASS called MOVIE can be used where METADATA fields such as /MACTOR for the movie actors in a particular movie where a particular actor and their role in the movie is identified, and the like. Note, the METADATA field can use the same identifiers such as /MACTOR to identify multiple actors as shown in TABLE 1. Note, the description of metadata and metadata fields are not limited and can be implemented in accordance with the disclosed exemplary embodiments. Some examples of METADATA fields are shown in TABLE 2. | |
| METADATA FIELD | |
| /NAME | Name of a person. In the form of FIRSTNAME "SPACE" LASTNAME |
| /BIRTHPLACE | Birthplace of a person. In the form of CITY |
| /MOVIEROLE | Name of a character in a movie. In the form of MOVIE "-" FIRSTNAME "SPACE" LASTNAME |
| /MACTOR | Actor playing a specific role in a movie. In the form of (the actor's) FIRSTNAME "SPACE" LASTNAME "-" (character's) FIRSTNAME "SPACE" LASTNAME |

TABLE 2-continued

| | |
|---|---|
| /TELEVISIONROLE | Name of a character in a television show. In the form of TELEVISION "-" FIRSTNAME "SPACE" LASTNAME |
| /TACTOR | Actor playing a specific role in a television show. In the form of (the actor's) FIRSTNAME "SPACE" LASTNAME "-" (character's) FIRSTNAME "SPACE" LASTNAME |
| /DIRECTOR | Director of a movie or television show. In the form of FIRSTNAME "SPACE" LASTNAME |
| /MMUSIC | Music selection associated with a movie or television show. In the form of MOVIE "-" MUSICGROUP "-" SONGTITLE |
| /MOBJECT | An item in a movie or television show. In the form of ITEMNAME |

In an exemplary embodiment, metadata can be stored in a database such as graphic object database 107 which is used for associating the metadata of a graphic object and the image associated with the graphic object. That is, the image of a graphical object and the associated metadata can be stored in graphic object database 107 for later retrieval by search engine 105. A graphical object can also have an associated tag file which has metadata within the tag file. A graphical object can be implemented where metadata is embedded within the graphic object itself. The metadata used to populate graphic object database 107 can come from a service such as Internet Movie Database, from a workflow when content is created, and the like.

Regardless of where the metadata of a graphic object is stored, search engine 105 can locate graphic objects and the metadata associated the graphic objects for use in a search query. That is, the selection of a graphical object as to be shown in following exemplary embodiments causes the associated metadata to be used as a basis of search query by search engine 105 which can be searched in a database such as results database 108.

For example, if a graphical object such as GEORGE-CLOONEY.JPG is selected as the basis of a search query, metadata fields such as /NAME, /BIRTHPLACE, /MOVIEROLE, and the like can be used in a search query by search engine 105 and are used to return various results from results database 108. The designation of how a search query is formulated depends on attributes such as a user's profile, search modifiers selected by a user, current search mode, and the like. That is, if a user designates a search modifier such as MOVIE with the graphical object associated with GEORGECLOONEY, the search query submitted to search engine 105 will submit the metadata field /NAME and the modifier MOVIE. Search engine 105 will then search through results database 108 for any movies matching the actor name George Clooney. The search results of results database 108 can be compared against the MOVIE CLASS in graphic object database 107 which would provide the graphic images of any movies that list George Clooney as an actor. Various examples of how results can be arranged are described in various disclosed exemplary embodiments.

Analytics database 109 can be used to analyze the behavior of a user when using content through a device such as a computer 120, set top box 130, tablet 140, television 150, phone 160, gateway 170, consumption device 180, and the like where such metrics can be used to develop a user profile. Some metrics that can be tracked by the analytics database include what searches a user conducts, what content a user buys, what content a user rents, what content a user views, what content a user skips over, what content is recommended to a user from another user, how long a user watches or listens to content, what commercials are watched or skipped, and the like. The tracking of metric information can then be used to classify what preferences a user has for content, actors, products, advertisements, and the like which then can be used for making recommendations to the user. For example, if the analytics database 109 tracks that a user likes watching action movies with Bruce Willis and sports, the user would have other action movies and sports selections recommended to the user as shown in disclosed embodiments. User profile information and associated recommendations can be generated and managed by an application running on analytics database 109. Search engine 105 can be implemented to use information from analytics database 109 when generating a search for content in accordance with disclosed exemplary embodiments.

Content server 110 can contain media such as audio, video, text, computer games, video games, and the like that is delivered to devices such as computer 120, set top box 130, tablet 140, television 150, phone 160, gateway 170, and consumption device 180 for operations such as recording and playback. Specifically, a user operating a device can request that content from content server 110 be transmitted as streamed content or downloaded where such content can be selected by a user by using the graphic object associated with such content in a manner consistent with presented exemplary embodiments. Note, multiple content servers 110 can also be used in accordance with the disclosed principles.

Consumption devices such as computer 120, set top box 130, tablet 140, television 150, phone 160, gateway 170, and the like can be used to operate search engine 105 to search for content and to have content delivered to such consumption devices upon the selection of a graphic object. The other databases such as graphic object database 107, results database 108, analytics database 109, and servers such as content server 110 can be accessed by these consumption devices as well. Gateway 170 can also operate as a communication bridge between a consumption device 180 which can be on a local network and the network or networks used to access search engine 105, databases 107, 108, 109, server 110, and the like.

Note that a graphic object can be representative of the contents of a web page which is returned as a result of a search query. That is, a graphic object represents an image of a web page which is returned from the results of search query performed by search engine 105. The metadata that is used for subsequent searches in accordance with the exemplary embodiments can be extracted using words that are on the webpage, metadata or words that point to the webpage, and the like. It is envisioned that exemplary embodiments support graphic objects that can be a mixture of content, image of people, objects, web pages, and the like.

Figure 2:
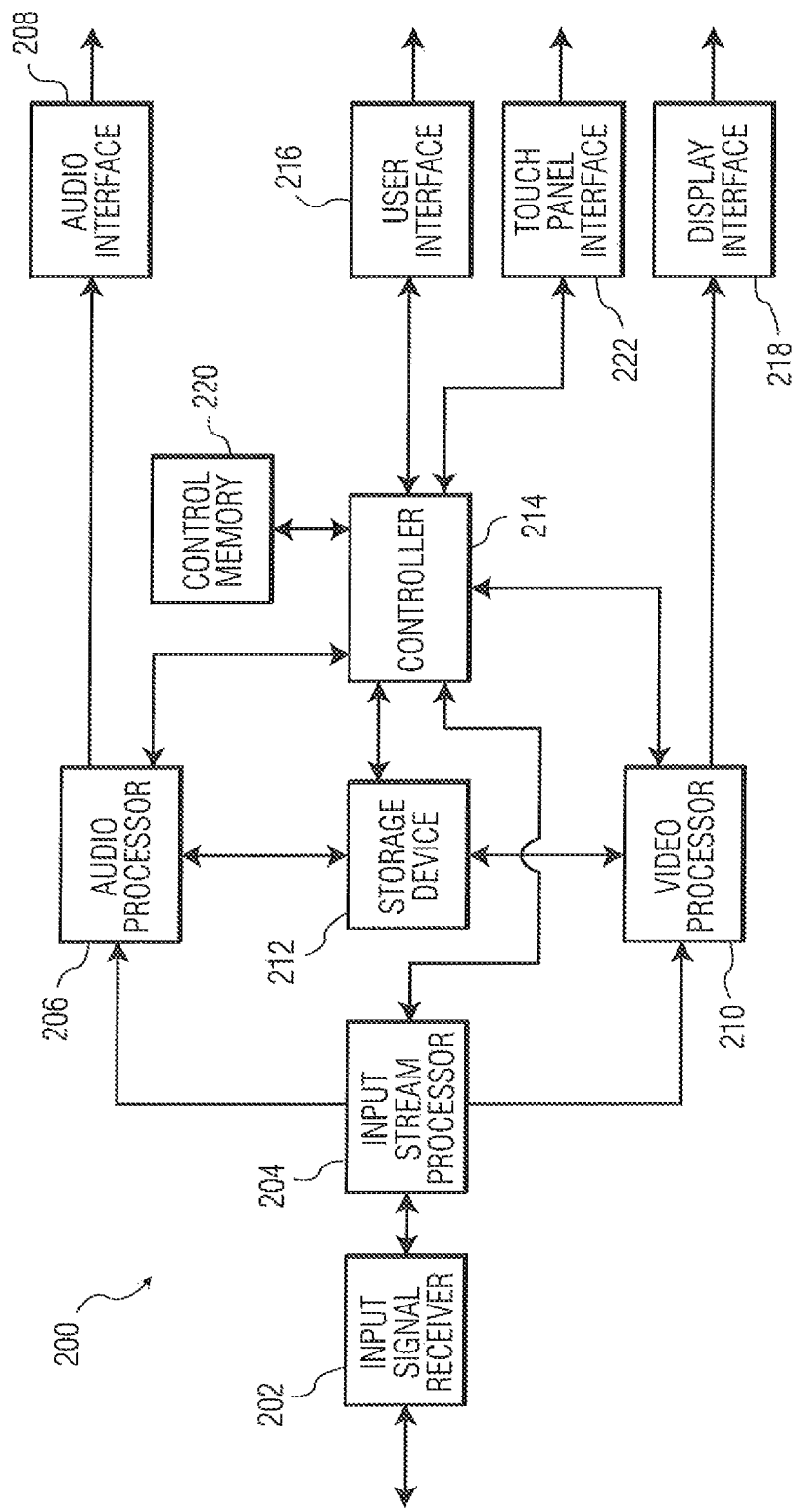
FIG. 2 is a block diagram of an exemplary consumption device in accordance with an embodiment of the present disclosure.

Turning now to FIG. 2, a block diagram of an embodiment of a consumption device 200 is shown. Consumption device 200 can operate similar to the devices such as a computer 120, set top box 130, tablet 140, television 150, phone 160, gateway 170, and the like described in FIG. 1. The device 200 shown can also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved by the input signal receiver 202 based on user input provided through a control interface or touch panel interface 222. Touch panel interface 222 can include an interface for a touch screen device. Touch panel interface 222 can also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio interface can also include amplifiers for driving one more sets of speakers. The audio processor 206 also performs any necessary conversion for the storage of the audio signals.

The video output from the input stream processor 204 is provided to a video processor 210. The video signal can be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI. It is to be appreciated that the display interface 218 will generate the various screens for presenting the search results in a two dimensional form as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 can interface with search engine 105 for the searching of content and the creation and adjusting of the display of graphical objects representing such content which can be stored or to be delivered via content server 110, described above.

The controller 214 is further coupled to control memory 220 (e.g., volatile or nonvolatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. Control memory can also store a database of elements, such as graphic elements containing content, various graphic elements used for generating a displayed user interface for display interface 218, and the like. Alternatively, the memory can store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that can be in an audio signal. Such audio watermarks can then be used to perform some action such as the recognition of the audio signal, security which identifies the source of an audio signal, or perform some other service. Furthermore, metadata to support the actions listed above can come from a network source which are processed by controller 214.

Figure 3:
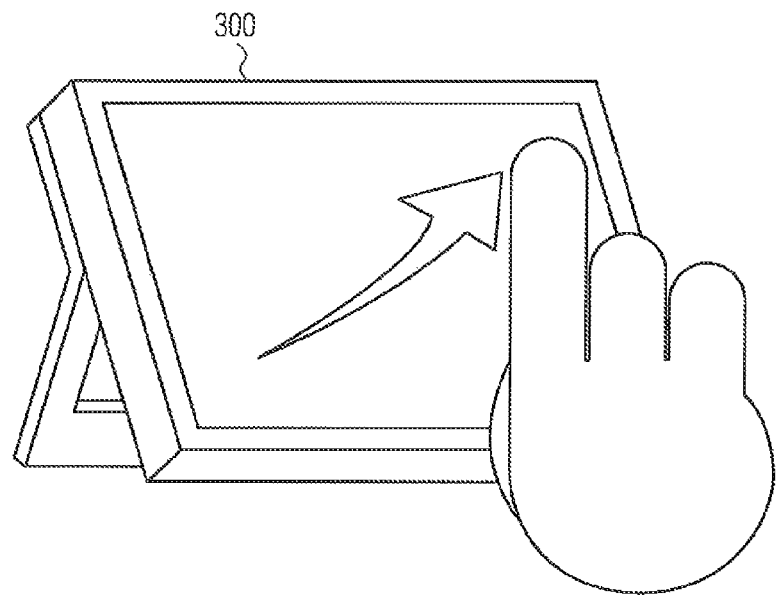
FIG. 3 is a perspective view of an exemplary media device in accordance with an embodiment of the present disclosure.

Turning now to FIG. 3, the user interface process of the present disclosure employs an input device that can be used to express functions, such as fast forward, rewind, etc. To allow for this, a tablet or touch panel device 300 on a consumption device (which is the same as the tablet 140 shown in FIG. 1 and/or computer 120, set top box 130, television 150, phone 160, and the like) can be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 can simply serve as a navigational tool to navigate the grid display or means that controls a second device via a user interface. In other embodiments, the touch panel 300 will additionally serve as the display device allowing the user to more directly interact with the navigation through the grid display of content. The touch panel device can be included as part of a remote control device containing more conventional control functions such as activator buttons. The touch panel 300 can also include at least one camera element. Note, various touch panel interface 222, buttons, softkeys, trackballs, stylus, touchpads, and the like can operate as an input interface providing a user the ability to control elements shown as part of user interface 216.

Figure 4:
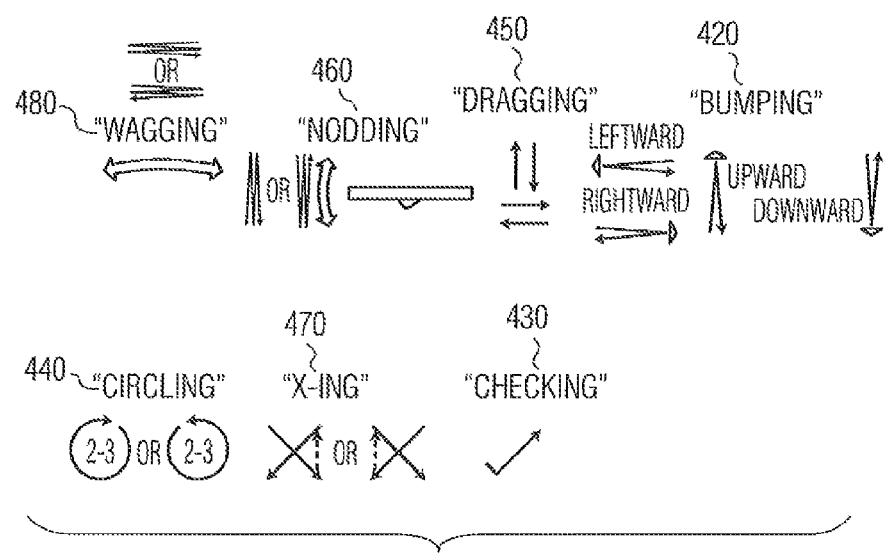
FIG. 4 illustrates an exemplary embodiment of the use of gestures for a sensing controller or touch screen in accordance with the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors (e.g., touch screen sensors and/or inertial sensors such as accelerators and/or gyroscopic sensors) can permit defining movement of a user's fingers on a touch screen or can even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 can be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel." That is, any of these types of gestures can be used to select to manipulate a graphic object in accordance with the disclosed embodiments.

Depending on the complexity of the sensor system, only simple one dimensional motion or gestures can be allowed. For instance, a simple right or left movement on the sensor as shown here can produce a fast forward or rewind function. In addition, multiple sensors could be included and placed at different locations on the touch screen. For instance, a horizontal sensor for left and right movement can be placed in one spot and used for volume up/down, while a vertical sensor for up and down movement can be place in a different spot and used for channel up and down. In this way specific gesture mappings can be used.

Figure 5:
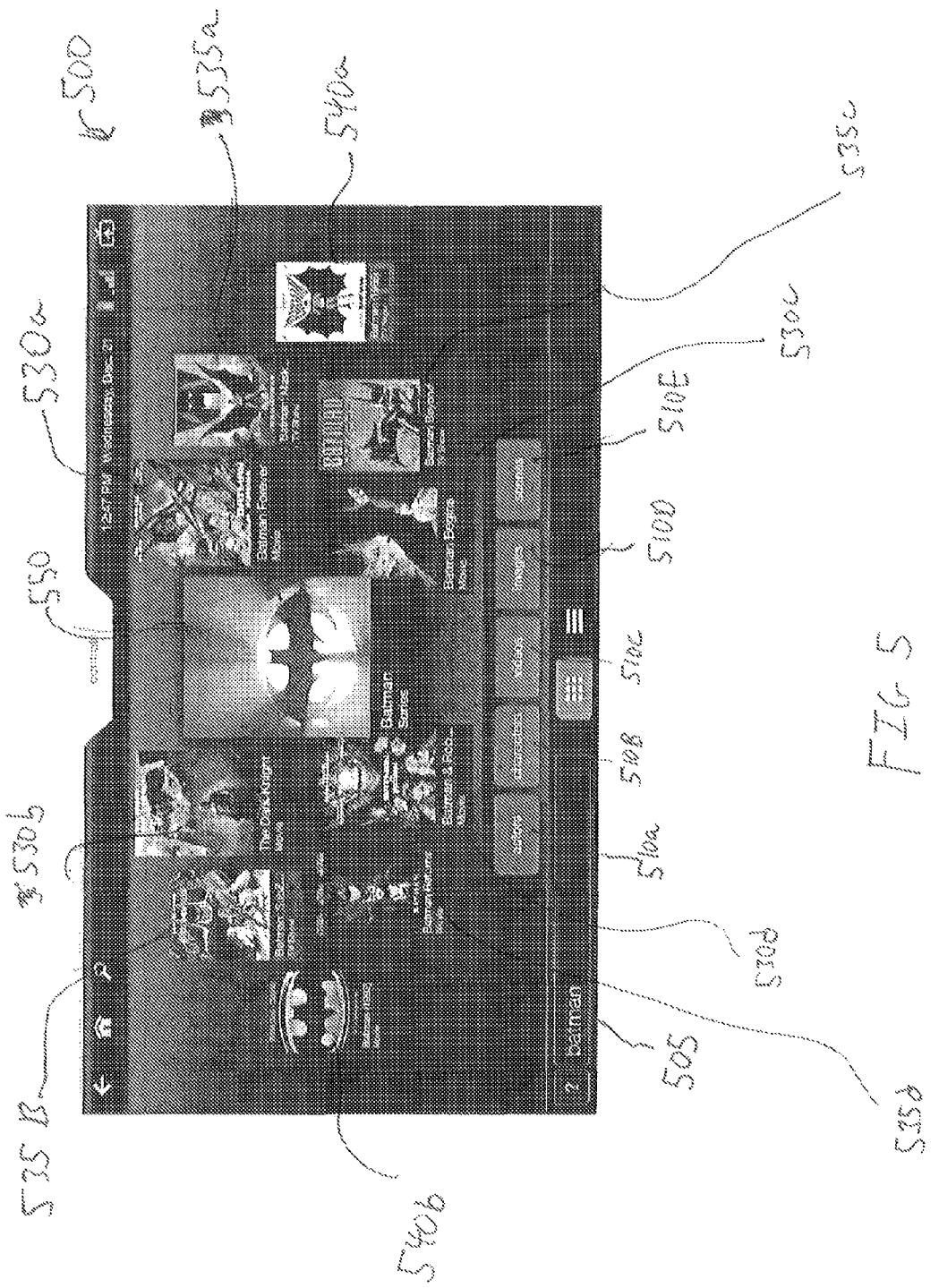
FIG. 5 illustrates an exemplary embodiment of a user interface displaying search results in the form of graphic objects in accordance with the present disclosure.

Turning to FIG. 5, a user interface 500 is shown that is used for perform searches. In text box 505, a user can input a textual string which when submitted to search engine 105, the results of such a search can be returned graphically using graphical objects as disclosed in various exemplary embodiments. In this specific example, the term "BATMAN" is used as the basis of search query.

The results of the search query are represented as various graphical objects where an exemplary embodiment, the graphical object 550 in the center of user interface represents the best match of the search query. Specifically, the graphical object 550 comporting to the Batman Series is the first ranked search results. The graphic objects which represents the second ranked search result is represented by graphical object 530*a* which corresponds to the content Batman Forever. The third ranked search result is graphical object 530*b* which comports to the movie The Dark Knight and so forth. Hence, the organization of the graphical objects in user interface 500 is that the closer a graphical object is to the center, the higher the corresponding search result was in a search query. Therefore, a graphical object such as 550 for Batman the movie is a better ranked search result than a graphical object 540*a* which corresponds to the Batman television show. Table 3 as provided below shows an example of how search results for a search submitted to search engine 105 correspond to the layout of graphical objects in user interface 500, although the return of search results can be affected by a user profile such as search history, user's consumption of content, and the like which can change the order of search results.

TABLE 3

| Search Result Ranking | Graphic Object Number | Description of Graphical Object |
| --- | --- | --- |
| 1 | 550 | Batman Series |
| 2 | 530a | Batman Forever Movie |
| 3 | 530b | The Dark Knight Movie |
| 4 | 530c | Batman Begins Movie |
| 5 | 530d | Batman & Robin Movie |
| 6 | 535a | Batman Mask Television Show |
| 7 | 535b | Batman SubZero Television Show |
| 8 | 535c | Batman Beyond Television Show |
| 9 | 535d | Batman Returns Movie |
| 10 | 540a | Batman Television Show |
| 11 | 540b | Batman Movie |

Figure 6:
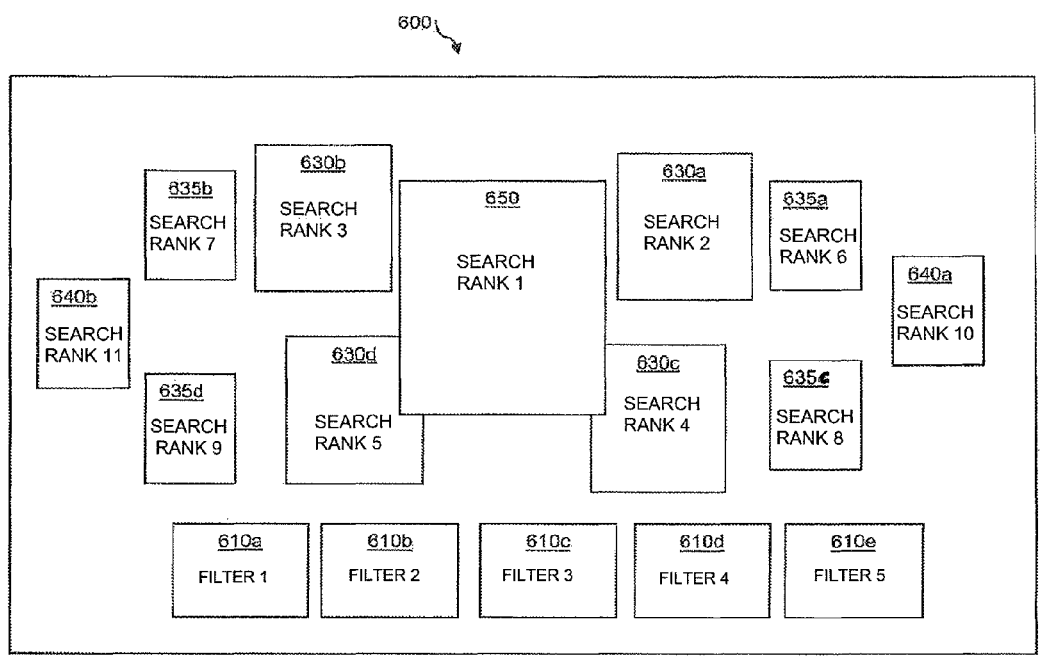
FIG. 6 illustrates an exemplary embodiment of a user interface displaying search results in the form of graphic objects in accordance with the present disclosure.

User interface 500 also presents various filters such as 510a, 510b, 510c, 510d, and 510e which can be used for further searches when using a graphical object as the basis of the search. For example, if a user is interested finding out about the actors that were in the content that corresponds to a displayed graphical object, the user can drag the graphical object using an input device or gesture and drop or overlay the graphical object on top of a filter. Hence, the dragging of the graphical object 530d for Batman & Robin over the filter 510a for actors would return a set of new graphical objects corresponding to images of the actors starring in the movie Batman & Robin as shown in user interface 600 displayed in FIG. 6. The corresponding actor images as represented as displayed graphical objects and the search results are shown in TABLE 4. Other filters such as for characters 510b, or filters that bring up additional content selections such as videos 510c, images 510d, and scenes 550e can be used to generate search results in accordance with disclosed exemplary embodiments.

TABLE 4

| Search Result Ranking | Graphic Object Number | Description of Graphical Object |
| --- | --- | --- |
| 1 | 650 | George Clooney |
| 2 | 630a | Uma Thurman |
| 3 | 630b | Arnold Schwarzenegger |
| 4 | 630c | Chris O'Donnell |
| 5 | 630d | Alicia Silverstone |
| 6 | 635a | Elle Macpherson |
| 7 | 635b | Vivica A. Fox |
| 8 | 635c | Michael Gough |
| 9 | 635d | Pat Hingle |
| 10 | 640a | Coolio |
| 11 | 640b | Eric Lloyd |

The arrangement of the filters shown for 610a, 610b, 610c, 610d, and 610e can change based upon several different factors. The first factor than can affect what filters get displayed depends on whether or not a user selects a particular mode for the display of search results. Specifically, such modes can be activated when a user selects a graphic object associated with a particular CLASS where examples are provided in TABLE 1. For example, if a user selects for a search an object that is associated with the CLASS MOVIE, filters that can be shown can include ACTOR, CHARACTERS, VIDEO, IMAGES, and SCENES. If a user selects an object associated with the CLASS ACTOR, different filters that can be shown include MOVIES, TELEVISION, CHARACTERS, and content related filters such as VIDEO, and IMAGES. Other filters combinations can be presented by mapping a specific CLASS to specific filter. One can also use a filter such as YEAR or SEASON to return search results associated with a particular year such as 1970 or 2010 or season such as Easter or Christmas, in accordance with the principles of the exemplary embodiments.

A second factor that can affect what filters are shown in a user interface is determined in regards to a user profile which can be developed in accordance with the use of the analytics database 109 as described in exemplary embodiments. In this situation, a group of filters is selected from a larger group of filters whereby the context of a search and/or the frequency of use of different filters affects such a ranking. For example, the most commonly selected filters used by a user for a search (MOVIES, TELEVISION, CHARACTERS, VIDEO, etc.) can be displayed more frequently than filters that are used less (MOVIE OBJECT, BIRTHPLACE, BIRTH YEAR, PRODUCTION YEAR etc.). The display of such filters will vary based on the preferences of a user.

A third factor that can affect what filters are shown in a user interface can be determined by the aggregate popularity of such filters by all users. In this example, the most popular filters selected by a large number of users will be the ones shown in a visual search user interface when a user selects a graphic object. A similar approach can be used to list filters that become more frequently selected than others in a particular period of time. Various combinations of such factors can be used in accordance with the disclosed exemplary embodiments.

Figure 7:
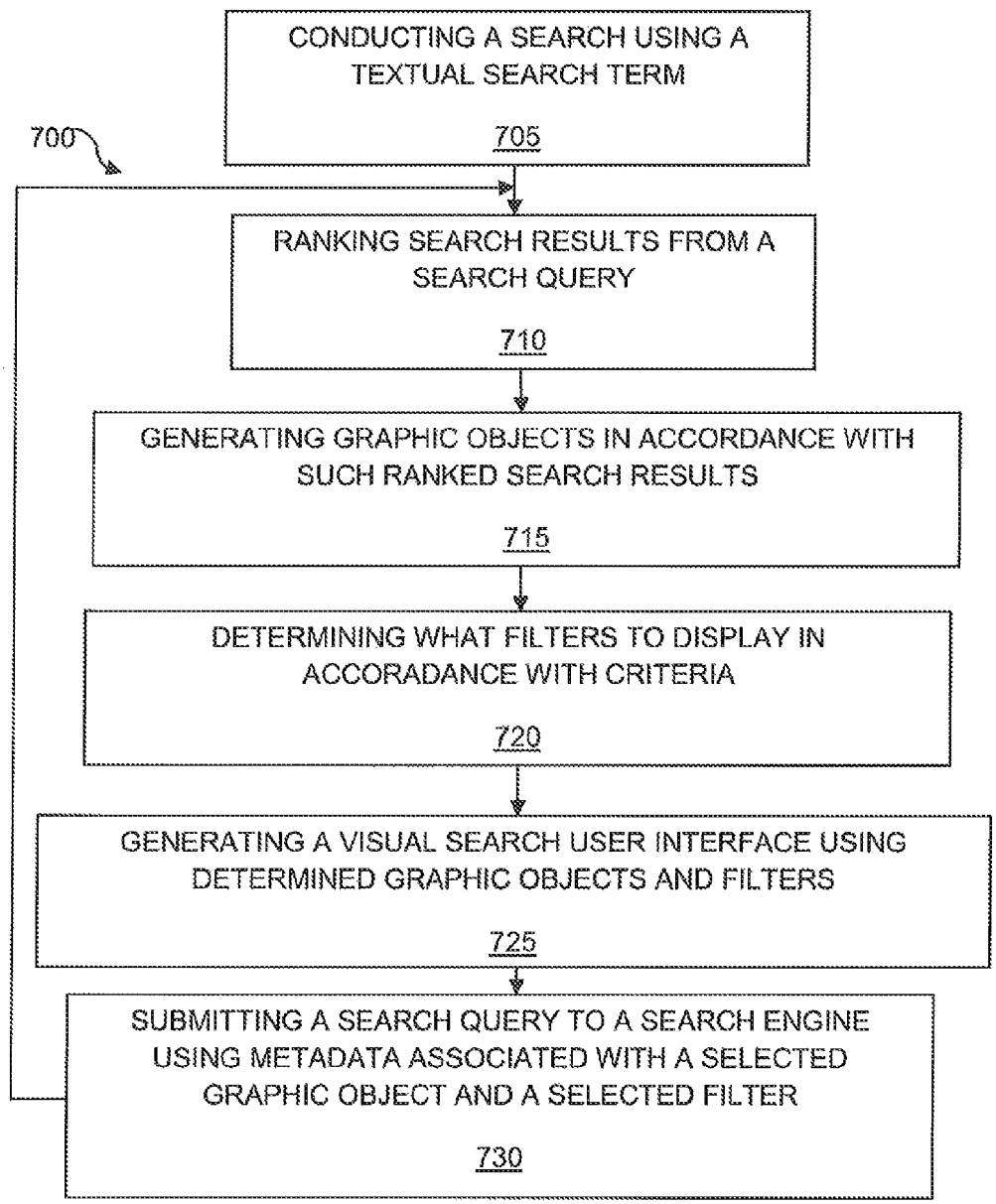
FIG. 7 displays an exemplar embodiment of a flowchart for conducting a visual search in accordance with the present disclosure.

Turning to FIG. 7, a flowchart 700 is shown that is used for perform searches in accordance with an exemplary embodiment. In step 705, a user can use a user interface to input a textual search term that is inputted to a search engine 105. The search term can be one or more words with various Boolean modifiers such as AND, NOT, OR, and the like.

The results of a search query are return by search engine 105 in step 710. Such search results can be derived from information contained with results database 108, or in accordance with other methods in accordance with the exemplary embodiments. The results are also ranked where the results that have a higher correlation for the search algorithm used will rank more favorably than other search results. As an optional embodiment, the search query submitted returns results that correlate highly to a user's profile as determined by analytics database 109 in accordance with described illustrative embodiments.

In step 715, the search results are correlated with the different graphic objects that are located in graphic object database 107. Such graphic objects can be determined by searching for metadata that matches elements of the search results in accordance with the exemplary embodiments. Various filters are also selected in step 720 where factors such as the CLASS of graphic objects shown, a user's profile of a preference of filters, an aggregate popularity of filters, and the like can be used for displaying what filters are to be available for a search operation. The determined graphic objects from step 715 and the determined filters from step 720 are then used to generate a visual search user interface in step 725 in accordance with the described illustrative embodiments.

In an alternative embodiment, the filters that can be shown for step 725 are determined once a user selects a particular graphic object where the class of the object affects what filters are shown. Hence, when a user selects a graphic object associated with a first CLASS, the filters shown will be different than if the user selects a graphic object associated with a second CLASS.

In step 730, in response to a user selecting a particular graphic object with a specific filter using a gesture, metadata associated with the graphic object and the filter are used to conduct a search by formulating a search query from the metadata and the filter. A filter can designate that only search results associated with a particular CLASS are to be returned from a search engine 105. For example such when a user selects a graphic object associated with the movie Batman and a filter associated ACTOR, the search results to be shown can be images of the various actors who have starred in the movie Batman in accordance with the disclosed exemplary embodiments.

A selected filter can also be used to influence the search results returned if there are not enough search results that are returned for a search query. For example, if a user selects a graphic object associated with the movie Batman and the filter associated with IMAGES, it is possible that there may be only a couple of images that are available to be returned. Hence, additional search results corresponding to VIDEOS or SCENES may be used to supplement the graphic objects that correspond to returned images from such a search. Other embodiments are possible in accordance with the described exemplary embodiments.

It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for a user interface comprising:
   selecting a plurality of graphic objects where said graphic objects correspond to the results of a search;
   selecting a plurality of filters from a group of filters where the plurality of filters are selected in accordance with a factor;
   generating a user interface to be displayed, said user interface comprising said selected graphic objects and said plurality of filters, wherein the closer a displayed graphic object is to the center of the user interface, the higher the corresponding search result is in the search query; and
   displaying a new set of graphic objects when one graphic object from said plurality of displayed graphic objects is dragged over one of said plurality of filters to perform a new search query, wherein the new search query applies the filter on which the graphic object is dragged to the search result corresponding to the graphic object, and returns a new set of graphic objects.

2. The method of claim 1 where said factor is a predefined mapping between the graphic objects to be displayed and said plurality of filters.

3. The method of claim 1 where said factor is determined in accordance with a user profile.

4. The method of claim 1 where said factor is determined in accordance with filters that are popular with a group of users.

5. The method of claim 1 comprising:
   submitting a search query in response to a selection of a graphic object from said plurality of graphic objects and a filter from said plurality of filters.

6. The method of claim 5 where said search query is generated from metadata associated with said selected graphic object and said selected filter.

7. The method of claim 6 where a second plurality of graphic objects is selected in response to the search results returned in response to the search query and a second plurality of filters are selected from said group of filters in accordance with a second factor.

8. The method of claim 7 where said second plurality of graphic objects and said second plurality of filters are displayed in a user interface.

9. The method of claim 1 where said graphic object is a representation of at least one of a person, content, and webpage.

10. An apparatus comprising one or more processors configured to:
    determine a plurality of graphic objects where said graphic objects correspond to the results of a search;
    determine a plurality of filters from a group of filters where the plurality of filters are selected in accordance with a factor;
    generate a user interface to be displayed, said user interface comprising said determined graphic objects and said plurality of filters, wherein the closer a displayed graphical object is to the center of the user interface, the higher the corresponding search result is in the search query; and output for display a new set of graphic objects when one graphic object from said plurality of displayed graphic objects is dragged over one of said plurality of filters to perform a new search query, wherein the new search query applies the filter on which the graphic object is dragged to the search result corresponding to the graphic object, and returns a new set of graphic objects.

11. The apparatus of claim 10 where said factor is a predefined mapping between the graphic objects to be displayed and said plurality of filters.

12. The apparatus of claim 10 where said factor is determined in accordance with a user profile.

13. The apparatus of claim 10 where said factor is determined in accordance with filters that are popular with a group of users.

14. The apparatus of claim 10 comprising:
a processor configured to submit a search query in response to a selection of a graphic object from said plurality of graphic objects and a filter from said plurality of filters.

15. The apparatus of claim 14 where said search query is generated from metadata associated with said selected graphic object and said selected filter.

16. The apparatus of claim 15 where a second plurality of graphic objects is selected in response to the search results returned in response to the search query and a second plurality of filters are selected from said group of filters in accordance with a second factor.

17. The apparatus of claim 16 where said second plurality of graphic objects and said second plurality of filters are displayed in a user interface.

18. An apparatus comprising:
a display that displays a user interface;
a input interface that is capable of being used to receive a search query and to manipulate at least one graphic object and at least one filter;
at least one controller adapted to:
generate said user interface displaying said at least one graphic object and said at least one filter wherein the closer a displayed graphical object is to the center of the user interface, the higher the corresponding search result is in the search query; and
generate a search query when at least one graphic object is dragged over said at least one displayed filter in response to a user gesture using said input interface where said search query is generated from metadata associated with the filter on which the graphic object is dragged and the search result corresponding to the dragged graphic object, the search query applying the filter on which the graphic object is dragged to the search result corresponding to the dragged graphical object, said controller further returning a new set of graphical objects.

19. The apparatus of claim 18 where said at least one filter is selected from a group of filters in response to a factor.

* * * * *